(12) United States Patent
Komiya et al.

(10) Patent No.: US 6,432,888 B1
(45) Date of Patent: *Aug. 13, 2002

(54) GREASE FOR ROLLING BEARING AND GREASE-SEALED ROLLING BEARING

(75) Inventors: Hiroshi Komiya; Toshikazu Kouno; Masayuki Kitamura; Toshihiro Kawaguchi; Seiji Okamura; Hiroki Iwamatsu, all of Osaka (JP)

(73) Assignees: Koyo Seiko Co., Ltd.; Nippon Grease Co., Ltd., both of Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/879,134

(22) Filed: Jun. 19, 1997

Related U.S. Application Data

(63) Continuation of application No. 08/607,157, filed on Feb. 26, 1996, now abandoned, which is a continuation-in-part of application No. 08/211,412, filed on Jul. 25, 1994, now abandoned.

(30) Foreign Application Priority Data

Aug. 5, 1992 (JP) ............................................. 4-208760

(51) Int. Cl.$^7$ ............................................. C10M 169/06
(52) U.S. Cl. ....................... 508/364; 508/379; 508/552; 508/581
(58) Field of Search ................................. 508/364, 379, 508/552, 581

(56) References Cited

U.S. PATENT DOCUMENTS

| 3,139,405 A | 6/1964 | Farmer et al. |
|---|---|---|
| 3,244,627 A | 4/1966 | Smith et al. |
| 3,400,140 A | 9/1968 | Rowan et al. |
| 3,513,094 A | 5/1970 | Farmer et al. |
| 3,988,249 A | 10/1976 | Gencarelli et al. |
| 4,098,705 A | 7/1978 | Sakurai et al. |
| 4,107,059 A | 8/1978 | King et al. |
| 4,479,883 A | 10/1984 | Shaub et al. |
| 4,692,256 A | 9/1987 | Umemura et al. |
| 4,789,492 A | 12/1988 | Katsumata et al. |
| 4,822,505 A | 4/1989 | Alexander |
| 4,840,740 A | 6/1989 | Sato et al. |
| 4,904,400 A | 2/1990 | Brown et al. |
| 5,059,336 A | 10/1991 | Naka et al. |
| 5,160,645 A | 11/1992 | Okaniwa et al. |
| 5,207,936 A | 5/1993 | Auzai et al. |
| 5,246,604 A | 9/1993 | Vartanian |
| 5,246,605 A | 9/1993 | Vartanian |

FOREIGN PATENT DOCUMENTS

| JP | 61-155496 | 7/1986 |
|---|---|---|
| JP | 3-210394 | 9/1991 |
| JP | 4-353599 | 12/1992 |

*Primary Examiner*—Jerry D. Johnson
(74) *Attorney, Agent, or Firm*—Jacobson Holman, PLLC

(57) ABSTRACT

The present invention is directed to a grease for a rolling bearing containing poly-α-olefin synthetic oil or diphenyl ether synthetic oil, a diurea thickening agent, and an organic antimony compound or an organic molybdenum compound. The present invention is also directed to a rolling bearing in which the grease for a rolling bearing is sealed. The organic antimony compound or the organic molybdenum compound reacts with a metal composing inner and outer bearing rings and a rolling element to form a compound film contributing to the reduction of the force in the tangential direction on a raceway surface of the bearing rings and a surface of the rolling element, thereby preventing an excessively large force in the tangential direction under high-speed rotation. This enables to lengthen the life of the rolling bearing used under particularly severe conditions such as high temperature, high-speed rotation and high road.

14 Claims, 1 Drawing Sheet

GREASE FOR ROLLING BEARING AND GREASE-SEALED ROLLING BEARING

This is a Continuation of Ser. No. 08/607,157, filed Feb. 26, 1996, now abandoned, which is a Continuation-In-Part of Ser. No. 08/211,412, filed Jul. 25, 1994, now abandoned.

BACKGROUND OF THE INVENTION

1. Field of the Invention

The present invention relates to grease for a rolling bearing and a grease-sealed rolling bearing which is used under severe conditions such as high temperature, high-speed rotation and high load.

2. Prior Art

In rolling bearings used around automobile engines and the like which operate at high temperatures, high rotations and high loads, their lives have been shorter than the theoretical lives due to increased severe operating conditions such as higher temperatures, higher-speed rotations and higher loads in recent years.

Recent studies have shown that the above disadvantage is not caused by the life of grease being sealed in the rolling bearing but the rolling bearing itself. Specifically, a large force in the tangential direction which accompanies slip is produced between a surface of a rolling element and a raceway surface of inner and outer bearing rings during high-speed rotation, leading to the fatigue life in early stages.

In order to reduce the force in the tangential direction which is exerted on the rolling bearings, there have been attempts to select a suitable lubricating base oil used in grease which meets the operating conditions and can exhibit optimum lubricity under high temperature and high speed rotation conditions. However, it has been difficult to satisfactorily comply with more severe operating conditions merely by selecting lubricating base oil.

An object of the present invention is to provide grease for a rolling bearing, which can prevent a rolling bearing used under particularly severe conditions from leading to the fatigue life in the early stages, to lengthen the life of the rolling bearing.

Another object of the present invention is to provide a grease-sealed rolling bearing having long life, which does not lead to the fatigue life in the early stages, even under severe conditions.

SUMMARY OF THE INVENTION

The present invention is directed to:

(A) grease for a rolling bearing used under severe conditions such as high temperature, high-speed rotation and high road, comprising (i) a lubricating base oil containing at least a poly-α-olefin synthetic oil or a diphenyl ether synthetic oil, (ii) a diurea thickening agent of the general formula:

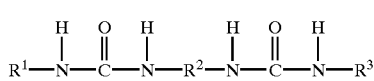

(1)

wherein $R^2$ is a diisocyanate residue, and $R^1$ and $R^3$ are amine residues, and (iii) a compound selected from the group consisting of an organic antimony compound and an organic molybdenum compound which can form reacted films with a metal composing inner and outer bearing rings and a rolling element of said rolling bearing on a raceway surface of said bearing rings and a surface of said rolling element; and (B) a grease-sealed rolling bearing in which the above grease for a rolling bearing is sealed.

In the grease for a rolling bearing and the grease-sealed rolling bearing, an organic antimony compound such as antimony dithiocarbamate or an organic molybdenum compound such as molybdenum dithiocarbamate, which have been contained as an anti-wear agent in the grease, reacts with a metal composing inner and outer bearing rings and a rolling element at high temperatures. For example, it is over 200° C. on the rolling contact areas in rolling bearings used in automobile engines. As a result, there are formed reacted films which can contribute to the reduction of the force in the tangential direction on a raceway surface of the bearing rings and a surface of the rolling element, thereby preventing the production of large force in the tangential direction at high-speed rotations.

By the poly-α-olefin synthetic oil or the diphenyl ether synthetic oil as lubricating base oil, and the diurea thickening agent of the general formula (1), optimum characteristics of the organic antimony compound or the organic molybdenum compound can be achieved. They also function to compose grease having lubricity most suited to the operating conditions of the rolling bearing.

Thus in the present invention, it is possible to lengthen the rolling bearing life by preventing the rolling bearing used under particularly severe conditions from leading to the fatigue life in the early stages.

DETAILED DESCRIPTION OF THE INVENTION

Figure 1:
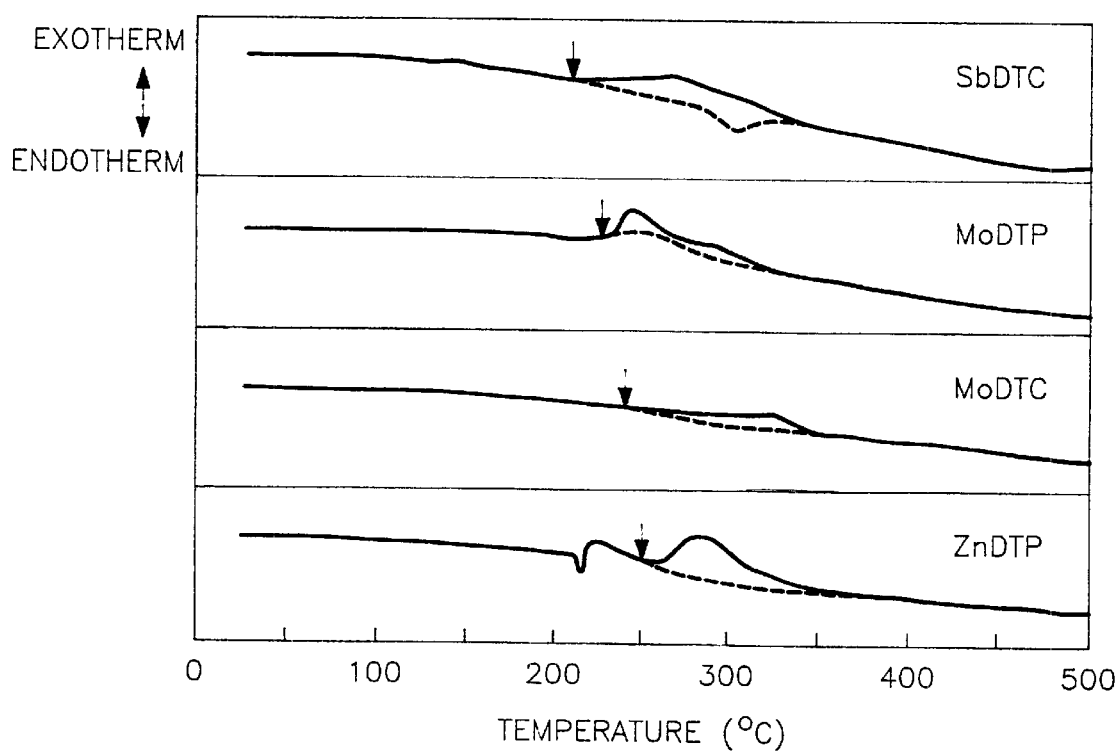
FIG. 1 is a graph showing the results of the differential thermal analysis for studying the reactivity between iron and the three types of anti-wear agents used in Examples and zinc dithiophosphate.

Examples of the organic antimony compounds as anti-wear agent include (i) an antimony dithiocarbamate of the general formula:

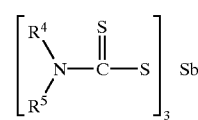

(2)

wherein $R^4$ and $R^5$ are same or different and each is a hydrogen atom, an alkyl group or an aryl group; and (ii) an antimony dithiophosphate of the general formula:

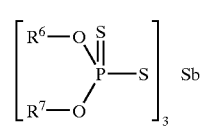

(3)

wherein $R^6$ and $R^7$ are same or different and each is a hydrogen atom, an alkyl group or an aryl group.

Practical examples of the antimony dithiocarbamate of the general formula (2) include "VANLUBE 73" (trade name) manufactured by R. T. Vanderbilt Company, Inc., and those of the antimony dithiophosphate of the general formula (3) include "VANLUBE 622" (trade name) manufactured by R. T. Vanderbilt Company, Inc.

Examples of the organic molybdenum compound include (i) a molybdenum dithiocarbamate of the general formula:

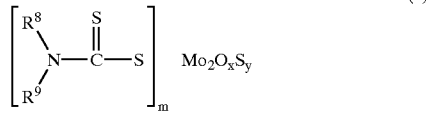
(4)

wherein $R^8$ and $R^9$ are same or different and each is a hydrogen atom, an alkyl group or an aryl group, and m, x and y are arbitrary numbers; and (ii) a molybdenum dithiophosphate of the general formula:

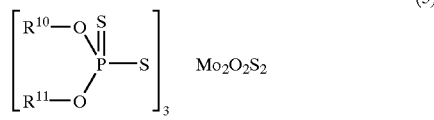
(5)

wherein $R^{10}$ and $R^{11}$ are same or different and each is a hydrogen atom, an alkyl group or an aryl group.

Practical examples of the molybdenum dithiocarbamate of the general formula (4) include "MOLYVAN A" (trade name) manufactured by R. T. Vanderbilt Company, Inc., and those of the molybdenum dithiophosphate of the general formula (5) include "MOLYVAN L" (trade name) manufactured by R. T. Vanderbilt Company, Inc.

The compounds as described can be used alone or in any combination thereof.

Although the amount of the organic antimony compound or the organic molybdenum compound as anti-wear agent is not particularly limited in the present invention, but is preferably about 0.1 to 5% by weight to the entire amount of lubricating base oil and a thickening agent that mainly compose the grease. If the amount of the anti-wear agent is less than 0.1% by weight, it might be difficult to form the reacted films that can satisfactorily reduce the force in the tangential direction, on the raceway surface of inner and outer bearing rings and the surface of a rolling element. Conversely, even when the amount exceeding 5% by weight is used, more improvement cannot be expected, causing the increase of the production cost.

The well-known compound similar to the antimony dithiocarbamate or the molybdenum dithiocarbamate is a zinc dithiocarbamate of the structural formula:

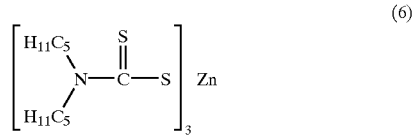
(6)

In the present invention, however, the zinc dithiocarbamate is unusable as an anti-wear agent because it cannot form the reacted films showing sufficient thickness, under severe conditions such as high temperature, high-speed rotation and high load. The zinc dithiocarbamate, however, functions as an antioxidant. It is therefore possible to use in combination with the organic antimony compound or the organic molybdenum compound within the range in which the function of these compounds are not affected.

As lubricating base oil, there is used lubricating base oil containing at least poly-α-olefin synthetic oil or diphenyl ether synthetic oil. The above lubricating base oil may be those consisting of the poly-α-olefin synthetic oil or the diphenyl ether synthetic, a mixture of both synthetic oils, or a mixture comprising at least one of the poly-α-olefin synthetic oil and the diphenyl ether synthetic oil as primary material, mineral oil and/or other ether synthetic oil.

As said other synthetic oils, there are known, for example, synthetic oil such as polybutene synthetic oil, polyalkylene glycol synthetic oil, polyol ester synthetic oil, diester synthetic oil, silicone synthetic oil and polyphenyl ether synthetic oil other than diphenyl ether synthetic oil.

The mineral oil or said other synthetic oils may be used in a similar range as in known grease which are mainly composed of the poly-α-olefin synthetic oil or the diphenyl ether synthetic oil, but preferably about not more than 30% by weight to the entire amount of the base oil.

As poly-α-olefin synthetic oil, there can be used a variety of synthetic oils having different kinds of olefin as raw material and polymerization degrees. Out of these, there is selected one having suited viscosity for the operating conditions (particularly, the operating temperature).

As diphenyl ether synthetic oil, there can be used a variety of synthetic oils having different molecular weights. Out of these, there is selected one having suited viscosity for the operating conditions (particularly, the operating temperature).

As a thickening agent, there is used a diurea thickening agent of the following general formula:

(1)

wherein $R^2$ is a diisocyanate residue, and $R^1$ and $R^3$ are same or different and each is an amine residue. The diurea thicking agent is produced by reacting a diisocyanate compound (1a) with amine compounds (1b) and (1c), by the following reaction scheme:

$$OCN—R^2—NCO$$
$$(1a)$$
$$+$$
$$R^1—NH_2$$
$$(1b)$$
$$+$$
$$R^1—NH_2$$
$$(1c)$$

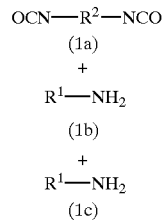

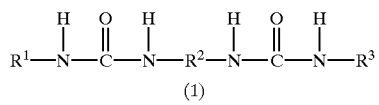
(1)

wherein $R^1$, $R^2$ and $R^3$ have the same meanings as defined above.

It is preferable that the reaction is conducted with lubricating base oil in order to obtain a reaction product having high uniformity. Specifically, the diisocyanate compound (1a) and the amine compounds (1b) and (1c) are separately dissolved in the lubricating base oil to obtain a diisocyanate solution and an amine solution, respectively. One of the solutions is gradually added to the other solution with stirring to allow the diisocyanate compound (1a) to react with the amine compounds (1b) and (1c), to give a diurea compound. Alternatively, the amine compounds (1b) and (1c) are dissolved in lubricating base oil to prepare two types of amine solutions, which were mixed with the diisocyanate solution to give a diurea compound.

The reaction mixture is heated with stirring to about 130 to 210° C., preferably 140 to 190° C., allowed to stand at that temperature for about 15 to 40 minutes, and cooled to not more than 120° C., preferably room temperature. This reaction mixture is kneaded using a homogenizer, a three-high roll or the like to give a grease composition in which the diurea compound is being uniformly dispersed in the lubricating base oil.

Additives such as anti-wear agents are preferably added after the reaction is complete, whereas components which do not hinder the reaction between the diisocyanate compound (1a) and the amine compounds (1b) and (1c), can be added to one of the solutions before the reaction.

Suitable examples of the diurea thickening agent include (a) a reaction product between 4,4'-diphenylmethane diisocyanate and either alkyl phenylamine or cyclohexylamine and (b) a reaction product of 4,4'-diphenylmethane diisocyanate, stearylamine and oleylamine. The alkyl phenylamines being material of the reaction product (a) include those having 8 to 16 carbon atoms in the alkyl portion, for example, p-dodecyl aniline. Particularly, the former reaction product neither rapidly softens at high temperatures nor scatters in the fiber state at high-speed rotations, so that it is stable for long period under the operating conditions such as high temperature and high-speed rotation (see Japanese Patent Unexamined Publication No. 61-155496 (1986).

The amount of the diurea thickening agent is not particularly limited in the present invention. It can be used varying amounts depending on the operating conditions of the grease, or the like, preferably from 0.3 to 30 parts by weight to 100 parts by weight of base oil.

To the grease for a rolling bearing in the present invention, various additives, for example, antioxidants, anti-corrosive agents, and extreme pressure agents such as potassium borate may be added in a similar quantities as in the conventional occasions.

The grease-sealed rolling bearing in the present invention is produced by sealing the grease for a rolling bearing. The sealing amount of the grease can be changed depending on the shape, the size and the like of the rolling bearing, within the range similar to that of the conventional occasions. The type of the rolling bearing is not particularly limited, so that the construction of the present invention is applicable to known rolling bearings of various types.

EXAMPLES

The present invention will be further illustrated by the following nonlimiting examples.

Example 1

A 128 g of p-dodecyl aniline and 50 g of cyclohexylamine as amine components were mixed with 850 g of poly-α-olefin (the viscosity at 100° C. is 8 mm$^2$/S), as lubricating base oil. The mixture was heated with stirring to 100° C. to prepare an amine solution.

Separately, 122 g of 4,4'-diphenylmethane diisocyanate as an isocyanate component was mixed with another 850 g of poly-α-olefin. The mixture was heated with stirring to 100° C. to prepare an isocyanate solution.

The amine solution was gradually added with stirring to the isocyanate solution to react the amine compound with the isocyanate compound, thereby forming a diurea compound in poly-α-olefin.

In order to uniformly disperse the diurea compound into poly-α-olefin, the reaction mixture was heated with stirring to 150° C., maintained at that temperature for 15 to 40 minutes, and was cooled to room temperature.

While stirring the above reaction mixture, 40 g of antimony dithiocarbamate in which $R^4$ and $R^5$ of the general formula (2) are both alkyl groups ["VANLUBE 73" (trade name) manufactured by, R. T. Vanderbilt Company, Inc.], 40 g of amine antioxidant and 40 g of anti-corrosive agent were added and then treated using a three-high roll to prepare grease for a rolling bearing.

Example 2

The procedures of Example 1 were carried out except that the amount of antimony dithiocarbamate was 2 g.

Example 3

The procedures of Example 1 were carried out except that the antimony dithiocarbamate was replaced by 40 g of molybdenum dithiocarbamate in which $R^8$ and $R^9$ of the general formula (4) are both alkyl groups ["MOLYVAN A" (trade name) manufactured by R. T. Vanderbilt Company, Inc.].

Example 4

The procedures of Example 1 were carried out except that the poly-α-olefin was replaced by the same amount of alkyl diphenyl ether (the viscosity at 100° C. is 12 mm$^2$/S), and the antimony dithiocarbamate was replaced by 40 g of molybdenum dithiophosphate in which $R^{10}$ and $R^{11}$ of the general formula (5) are both alkyl groups ["MOLYVAN L" (trade name) manufactured by R. T. Vanderbilt Company, Inc.].

Example 5

The procedures of Example 1 were carried out except that 153 g of stearylamine and 51 g of oleylamine were used as amine components, and the amount of 4,4'-diphenylmethane diisocyanate as an isocyanate component was 96 g.

Example 6

The procedures of Example 1 were carried out except that the poly-α-olefin was replaced by the same amount of alkyl diphenyl ether (the viscosity at 100° C. is 12 mm$^2$/S).

Example 7

The procedures of Example 6 were carried out except that the antimony dithiocarbamate was replaced by 40 g of a similar molybdenum dithiocarbamate of Example 3.

Example 8

The procedures of Example 6 were carried out except that the antimony dithiocarbamate was replaced by 20 g of a similar molybdenum dithiocarbamate of Example 3 and 20 g of a similar molybdenum dithiophosphate of Example 4.

Comparative Example 1

The procedures of Example 1 were carried out except that no antimony dithiocarbamate was used.

Comparative Example 2

The procedures of Example 1 were carried out except that the antimony dithiocarbamate was replaced by 40 g of zinc dithiocarbamate of the general structural formula (6) ["VANLUBE AZ" (trade name) manufactured by R. T. Vanderbilt Company, Inc.].

Comparative Example 3

The procedures of Example 1 were carried out except that the antimony dithiocarbamate was replaced by 40 g of potassium borate.

Measurement of Worked Penetration

The worked penetration of each grease prepared in Examples and Comparative Examples was determined according to the worked penetration measuring method prescribed in JIS K 2220 "Grease". The results are shown in Tables 1–3.

The following tests were conducted after 2 g of each grease was sealed in a double sealed radial ball bearing (the bearing number is "6303ZZ"). The results are shown in Tables 1 to 3.

Measurement of Coefficient of Traction

The coefficient of traction was determined using a four-cylinder rolling friction testing machine, under the test conditions: the load of 1.23 KN; the rotation speed of 1500 r.p.m.; and the slip of 1%.

Measurement of Bearing Life

A radial rolling bearing in which each grease for a bearing had been sealed was operated at high speed and high load for 1000 hours to determine the time elapsed until a flaking occurred on the raceway surface of the bearing rings to damage the bearing. Four radial rolling bearings were used every grease.

Operating Conditions

Rotation speed: 18000 r.p.m.

Radial load: 250 kg

Temperature: 90° C.

Rated load C: 13.5 KN

Abbreviations in Tables 1 to 3 correspond to the following compounds:

PAO: poly-α-olefin

ADE: alkyl diphenyl ether

MDI: 4,4'-diphenylmethane diisocyanate

PDA: p-dodecyl aniline

CHA: cyclohexylamine

StA: stearylamine

OrA: oleylamine

SbDTC: antimony dithiocarbamate

MoDTC: molybdenum dithiocarbamate

MODTP: molybdenum dithiophosphate

ZnDTC: zinc dithiocarbamate

KBR: potassium borate

TABLE 1

| Example No. | Base oil | Thickening agent MDI | PDA | CHA | StA | OrA | Anti-wear agent | Consistency (60 work) | *1 C.O.T. | Bearing life |
|---|---|---|---|---|---|---|---|---|---|---|
| 1 | PAO 1700 | 122 | 128 | 50 | — | — | SbDTC 40 | 272 | 0.042 | No peeling off in 1000 hrs. |
| 2 | PAO 1700 | 122 | 128 | 50 | — | — | SbDTC 2 | 269 | 0.048 | |
| 3 | PAO 1700 | 122 | 128 | 50 | — | — | MoDTC 40 | 275 | 0.045 | |
| 4 | ADE 1700 | 122 | 128 | 50 | — | — | MoDTC 40 | 265 | 0.049 | |

*1 Coefficient of traction

TABLE 2

| Example No. | Base oil | Thickening agent MDI | PDA | CHA | StA | OrA | Anti-wear agent | Consistency (60 work) | *1 C.O.T. | Bearing life |
|---|---|---|---|---|---|---|---|---|---|---|
| 5 | PAO 1700 | 96 | — | — | 153 | 51 | SbDTC 40 | 275 | 0.043 | No peeling off in 1000 hrs. |
| 6 | ADE 1700 | 122 | 128 | 50 | — | — | SbDTC 40 | 250 | 0.047 | |
| 7 | ADE 1700 | 122 | 128 | 50 | — | — | MoDTC 40 | 262 | 0.048 | |
| 8 | ADE 1700 | 122 | 128 | 50 | — | — | MoDTC 20 MoDTP 40 | 248 | 0.047 | |

*1 Coefficient of traction

TABLE 3

| Comparative example No. | Base oil | Thickening agent MDI | PDA | CHA | StA | OrA | Anti-wear agent | Consistency (60 work) | *1 C.O.T. | Bearing life (hrs.) |
|---|---|---|---|---|---|---|---|---|---|---|
| 1 | PAO 1700 | 122 | 128 | 50 | — | — | — | 273 | 0.059 | 58, 87, 107, 89 |
| 2 | PAO 1700 | 122 | 128 | 50 | — | — | ZnDTC 40 | 270 | 0.060 | 65, 105, 131, 109 |
| 3 | PAO 1700 | 122 | 128 | 50 | — | — | KBR 40 | 269 | 0.057 | 212, 187, 169, 134 |

*1 Coefficient of traction

From the results in Tables 1 to 3, it was confirmed that Comparative Example 1 containing neither the organic antimony compound nor the organic molybdenum compound, Comparative Example 2 containing the zinc dithiocarbamate and Comparative Example 3 containing the potassium borate were damaged in significantly short period, whereas Examples 1 to 5 are free from damage in 1000 hours.

From the comparison between Examples 1 to 3 and 5 using a similar poly-α-olefin as lubricating base oil and Comparative Examples 1 to 3, it was confirmed that the coefficient of traction could be decreased by adding the organic antimony compound or the organic molybdenum compound.

These show that the organic antimony compound or the organic molybdenum compound reacts with the metal composing inner and outer bearing rings and the rolling element to form reacted films that contribute to the reduction of the force in the tangential direction on the raceway surface of the bearing rings and the surface of the rolling element.

From the comparison between Examples 1 and 2, to which a similar antimony dithiocarbamate was added, it was confirmed that the antimony dithiocarbamate did not affect the bearing life although there observed a slight variation in the coefficient of traction depending on its amount.

From the comparison between Examples 1 and 5, to which the same amount of the antimony dithiocarbamate was added, it was confirmed that both grease presented almost same performance, irrespective of the kind of diurea thickening agent.

The results of Examples 1 and 3 showed that the grease presented almost same performance even when the antimony dithiocarbamate was replaced by the same amount of molybdenum dithiocarbamate.

The results of Example 4 showed that the bearing life could be prolonged by the addition of the organic molybdenum compound, irrespective of the kind of lubricating base oil.

Study of Reactivity with Iron

As to the three types of the anti-wear agents: the SbDTC; the MoDTP; and the MoDTC used in Examples, and zinc dithiophosphate, the reactivity with iron was examined according to the differential thermal analysis.

A 5 μl of each anti-wear agent and 50 mg of iron powder were enclosed in a closed-type container used for the differential thermal analysis which was made of stainless steel (SUS304). The container was heated from room temperature to 500° C. at programming rate of 10° C./min. to obtain the peaks of exothermic and endothermic according to the differential thermal analysis. The results were shown with solid lines in FIG. 1.

Separately, a similar measurement was conducted for the cases where 5 μl of each compound alone was enclosed in the container. The results were shown with broken lines in FIG. 1.

From the above results, the reaction start temperatures between each compound and iron powder were individually obtained as shown with arrows in FIG. 1, specifically, as shown in Table 4.

TABLE 4

| Compound | Reaction Start Temperature |
| --- | --- |
| SbDTC | 205° C. |
| MoDTP | 225° C. |
| MoDTC | 240° C. |
| ZnDTP | 250° C. |

From Tables 4 and FIG. 1, it was confirmed that all the anti-wear agent used in Examples were reacted with iron at high temperatures of not less than 200° C. and that their reaction start temperatures were lower than that of the ZnDTP, and therefore, every anti-wear agent could be rapidly reacted with iron than the ZnDTP at the high temperatures as described.

What is claimed is:

1. Grease for a rolling bearing used under severe conditions in which the temperature on the rolling contact areas in the rolling bearing is over 200° C., high-speed rotation reaching 18,000 r.p.m. and high load, comprising (i) lubricating base oil containing at least poly-α-olefin synthetic oil or diphenyl ether synthetic oil, (ii) a diurea thickening agent which is synthesized by reacting 1 mol of a 4,4'-diphenylmethane diisocyanate and total 2 mol of a p-dodecylanyline and a cycrohexylamine in the lubricating base oil, or a diurea thickening agent which is synthesized by reacting 1 mol of a 4,4'-diphenylmethane diisocyanate and total 2 mol of a stearylamine and an oleylamine in the lubricating base oil, and (iii) an antimony dithiocarbamate which forms reacted films with a metal composing inner and outer bearing rings and a rolling element of said rolling bearing on a raceway surface of said bearing rings and a surface of said rolling element.

2. Grease for a rolling bearing according to claim 1, wherein the antimony compound is antimony dithiocarbamate of the general formula:

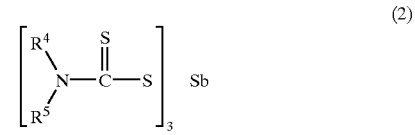

(2)

wherein $R^4$ and $R^5$ are same or different and each is a hydrogen atom, an alkyl group or an aryl group.

3. Grease for a rolling bearing according to claim 1, wherein the poly-α-olefin synthetic oil is poly-α-olefin.

4. Grease for a rolling bearing according to claim 1, wherein the diphenyl ether synthetic oil is alkyl diphenyl ether.

5. Grease for a rolling bearing according to claim 1, wherein the antimony compound is present in an amount of 0.1 to 5% by weight with respect to the entire amount of the lubricating base oil and the thickening agent.

6. Grease for a rolling bearing according to claim 1, wherein the diurea thickening agent is present in an amount of 0.3 to 30 parts by weight with respect to 100 parts by weight of the base oil.

7. Grease for a rolling bearing used under severe conditions in which the temperature of the rolling contact areas in the rolling bearing is over 200° C., high-speed rotation reaching 18,000 r.p.m. and high load, comprising (i) lubricating base oil containing at least poly-α-olefin synthetic oil or diphenyl ether synthetic oil, (ii) a diurea thickening agent which is synthesized by reacting 1 mol of a 4,4'-diphenylmethane diisocyanate and total 2 mol of a p-dodecylanyline and a cycrohexylamine in the lubricating base oil, or a diurea thickening agent which is synthesized by reacting 1 mol of a 4,4'-diphenylmethane diisocyanate and total 2 mol of a stearylamine and an oreylamine in the lubricating base oil, and (iii) at least one compound selected from a molybdenum dithio carbamate and a molybdenum dithio phosphate which forms reacted films with a metal composing inner and outer bearing rings and a rolling element of said rolling bearing on a raceway surface of said bearing rings and a surface of said rolling element.

8. Grease for a rolling bearing according to claim 7, wherein the molybdenum compound is molybdenum dithiocarbamate of the general formula:

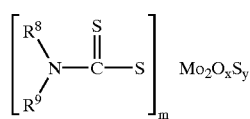

(4)

wherein $R^8$ and $R^9$ are same or different and each is a hydrogen atom, an alkyl group or an aryl group, and m, x and y are integers.

9. Grease for a rolling bearing according to claim 7, wherein the molybdenum compound is molybdenum dithiophosphate of the general formula:

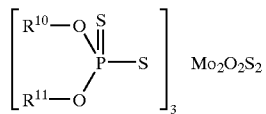

(5)

wherein $R^{10}$ and $R^{11}$ are same or different and each is a hydrogen atom, an alkyl group or an aryl group.

10. Grease for a rolling bearing according to claim 7, wherein the poly-α-olefin synthetic oil is poly-α-olefin.

11. Grease for a rolling bearing according to claim 7, wherein the diphenyl ether synthetic oil is alkyl diphenyl ether.

12. Grease for a rolling bearing according to claim 7, wherein the molybdenum compound is present in an amount of 0.1 to 5% by weight with respect to the entire amount of the lubricating base oil and the thickening agent.

13. Grease for a rolling bearing according to claim 7, wherein the diurea thickening agent is present in an amount of 0.3 to 30 parts by weight with respect to 100 parts by weight of the base oil.

14. A grease-sealed rolling bearing used under severe conditions in which the temperature on the rolling contact areas in the rolling bearing is over 200° C., high-speed rotation reaching 18,000 r.p.m. and high load, wherein the composition used to form the grease comprises (i) lubricating base oil containing at least poly-α-olefin synthetic oil or diphenyl ether synthetic oil, (ii) a diurea thickening agent which is synthesized by reacting 1 mol of a 4,4'-diphenylmethane diisocyanate and total 2 mol of a p-dodecylanyline and a cycrohexylamine in the lubricating base oil, or a diurea thickening agent which is synthesized by reacting 1 mol of a 4,4'-diphenylmethane diisocyanate and total 2 mol of a stearylamine and an oreylamine in the lubricating base oil, and (iii) at least one compound selected from the group consisting of an antimony dithio carbamate, molybdenum dithio carbamate and molybdenum dithio phosphate which forms reacted films with a metal; further comprising inner and outer bearing rings and a rolling element of said rolling bearing and surface films formed by the reaction of said compound with said bearing rings and said rolling element on a raceway surface of said bearing rings and a surface of said rolling element.

* * * * *